United States Patent [19]
Angell et al.

[11] Patent Number: 5,683,527
[45] Date of Patent: Nov. 4, 1997

[54] FOAMABLE ORGANOSILOXANE COMPOSITIONS CURABLE TO SILICONE FOAMS HAVING IMPROVED ADHESION

[75] Inventors: Gloria Lynne Angell; Michael Andrew Lutz, both of Midland, Mich.

[73] Assignee: Dow Corning Corporation, Midland, Mich.

[21] Appl. No.: 775,123

[22] Filed: Dec. 30, 1996

[51] Int. Cl.$^6$ .................. B32B 5/18; C08J 9/00

[52] U.S. Cl. .................. 156/78; 156/307.3; 521/86; 521/88; 521/90; 521/93; 521/117; 521/122; 521/125; 521/149; 521/150; 521/154

[58] Field of Search .................. 521/86, 88, 125, 521/90, 93, 117, 122, 149; 156/78, 307.3

[56] References Cited

U.S. PATENT DOCUMENTS

| | | | |
|---|---|---|---|
| 3,419,593 | 12/1968 | Willing | 260/448.2 |
| 3,923,705 | 12/1975 | Smith | 260/2.5 S |
| 4,026,843 | 5/1977 | Kittle | 260/2.5 S |
| 4,087,585 | 5/1978 | Schulz | 428/429 |
| 4,189,545 | 2/1980 | Modic | 521/131 |
| 4,590,222 | 5/1986 | Bauman | 521/88 |
| 4,599,367 | 7/1986 | Bauman et al. | 521/71 |
| 4,659,851 | 4/1987 | Plueddemann | 556/431 |
| 4,742,103 | 5/1988 | Morita et al. | 524/174 |
| 5,252,627 | 10/1993 | Bauman et al. | 521/154 |

FOREIGN PATENT DOCUMENTS

| | | |
|---|---|---|
| 497-349 A2 | 5/1992 | European Pat. Off. |
| 60-101146 | 6/1985 | Japan. |

OTHER PUBLICATIONS

U.S. Ser. No. 540,815, Gray et al., filed Oct. 11, 1995.

*Primary Examiner*—Morton Foelak
*Attorney, Agent, or Firm*—Paula J. Lagattuta

[57] ABSTRACT

A foamable, curable organosiloxane composition comprising an alkenyl-functional polyorganosiloxane, an organohydrogensiloxane, a blowing agent, a platinum catalyst and an adhesion promoter comprising an epoxy-functional compound, a hydroxyl-functional compound, a tetraalkylorthosilicate, an organotitanate and an aluminum or zirconium compound.

3 Claims, No Drawings

FOAMABLE ORGANOSILOXANE COMPOSITIONS CURABLE TO SILICONE FOAMS HAVING IMPROVED ADHESION

BACKGROUND OF THE INVENTION

1. Field of the Invention

This invention relates to foamable organosiloxane compositions. More particularly, this invention relates to foamable organosiloxane compositions containing an adhesion promoter that yields; upon cure, a silicone foam with improved adhesion.

2. Description of the Related Art

Foamable compositions comprising a curable liquid polyorganosiloxane, an organohydrogensiloxane, a hydroxyl-containing compound and a platinum group metal or a compound thereof as the foaming and curing catalyst have been described in the patent and journal literature. Relevant patents include U.S. Pat. Nos. 3,923,705, which issued on Dec. 2, 1975; 4,026,843, which issued on May 31, 1977; 4,189,545, which issued on Feb. 19, 1980; 4,590,222, which issued on May 20, 1986; and 4,599,367, which issued on Jul. 8, 1986, and 5,252,627, which issued on Oct. 12, 1993.

In U.S. Pat. No. 5,595,826, issued on Jan. 21, 1997, (U.S. patent application Ser. No. 08/540,815) filed on Oct. 11, 1995 and entitled "Compositions with Improved Adhesion") Lutz et al. teach an organosiloxane composition comprising an alkenyl-functional organopolysiloxane, an organohydrogensiloxane, an epoxy-functional compound, a compound having a hydroxyl group and a silicon hydride, alkenyl or acyl group and an aluminum or zirconium compound.

One objective of this invention is to provide foamable compositions which yield, upon cure, silicone foams that will adhere to plastics and other substrates.

SUMMARY OF THE INVENTION

The present invention provides a foamable, curable organosiloxane composition which yields, upon cure, a silicone foam having improved adhesion to a variety of substrates. The organosiloxane composition of the present invention comprises a polyorganosiloxane containing an average of at least two alkenyl radicals per molecule, an organohydrogensiloxane having an average of at least two silicon-bonded hydrogen atoms per molecule, a blowing agent, a platinum catalyst, and an adhesion promoter. The adhesion promoter comprises an epoxy-functional compound; a compound comprising at least one hydroxy group and in the same molecule at least one alkenyl group; a tetraalkylorthosilicate; an organotitanate; and an aluminum compound or a zirconium compound.

The present invention also provides a method of improving the adhesion of a silicone foam to a substrate comprising the steps of preparing a foam-forming composition comprising a polyorganosiloxane containing an average of at least two alkenyl radicals per molecule, an organohydrogensiloxane having an average of at least two silicon-bonded hydrogen atoms per molecule, a blowing agent, a platinum catalyst, and an adhesion promoter, wherein the adhesion promoter comprises an epoxy-functional compound; a compound comprising at least one hydroxy group and in the same molecule at least one alkenyl group; a tetraalkylorthosilicate; an organotitanate: and an aluminum compound or a zirconium compound; applying the foam-forming composition to a substrate; and foaming and curing the foam-forming composition.

DETAILED DESCRIPTION OF THE INVENTION

The present invention provides a foamable, curable organosiloxane composition which yields, upon cure, a silicone foam having improved adhesion to a variety of substrates. The organosiloxane composition of the present invention comprises:

(A) a polyorganosiloxane containing an average of at least two alkenyl radicals per molecule;

(B) an organohydrogensiloxane having an average of at least two silicon-bonded hydrogen atoms per molecule;

(C) a blowing agent;

(D) a platinum catalyst; and (E) an adhesion promoter comprising:
  i) an epoxy-functional compound;
  ii) a hydroxyl-functional compound comprising at least one hydroxy group and in the same molecule at least one alkenyl group;
  iii) a tetraalkylorthosilicate;
  iv) an organotitanate; and
  v) an aluminum compound or a zirconium compound;

wherein the sum of the average number of alkenyl groups in component (A) and the average number of silicon-bonded hydrogen groups in component (B) is greater than 4.

The Polyorganosiloxane—Component (A)

Component (A) is an polyorganosiloxane containing an average of at least two alkenyl groups per molecule. It is the major component of the composition of the present invention. In order for the composition of the present invention to properly crosslink, component (A) must contain an average of at least two alkenyl groups per molecule. In preferred embodiments, component (A) contains alkenyl groups having from 2 to 12 carbon atoms. Preferred alkenyl groups are represented by the formula —$R^1CH=CH_2$, where $R^1$ represents a single bond or an alkylene group containing from 2 to 10 carbon atoms. The alkylene group can be linear or branched. Examples of preferred alkenyl groups include but are not limited to vinyl, 2-propenyl, 3-butenyl, 5-hexenyl, 7-octenyl and 10-undecenyl. More preferred alkenyl groups are vinyl and hexenyl. In preferred embodiments, at least one alkenyl group is located at the terminal of the molecule chain. In more preferred embodiments, at least two alkenyl groups are located at two of the terminals of the molecular chain.

In preferred embodiments, component (A) is represented by the general formula:

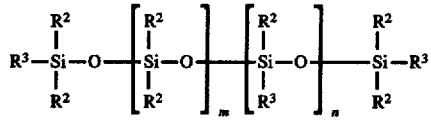

wherein each $R^2$ is individually selected from the group consisting of unsubstituted and substituted monovalent hydrocarbon groups containing from 1 to 20 carbon atoms; $R^3$ is $R^2$ or an alkenyl group; $m \geq 0$; and the value of n is selected such that component (A) has an average of at least two alkenyl groups per molecule. Preferably $R^2$ is an unsubstituted monovalent hydrocarbon group having less than 7 carbon atoms or a halogenated alkyl group having less than 7 carbon atoms. More preferably $R^2$ is alkyl group, such as methyl or ethyl, a cycloalkyl group such as cyclohexyl, an aryl group, such as phenyl, or a halogenated alkyl group, such as chloromethyl, 3-chloropropyl or 3,3,3-trifluoropropyl. Most preferably, $R^2$ is methyl. In preferred embodiments, n is zero.

Generally the siloxane is polymerized to a viscosity of from 0.03 to 500 Pa.s at 25° C., preferably from 2 to 250 Pa.s. It is possible to use either higher or lower viscosity polymers.

The polyorganosiloxane of the present invention may be a homopolymer, or a copolymer. A single polyorganosiloxane can be used or a mixture of different polyorganosiloxanes.

Methods for preparing the polyorganosiloxanes of component (A) are sufficiently disclosed in the patent and other literature such that a detailed description in this specification is not necessary.

The Organohydrogensiloxane—Component (B)

Component (B) of the present invention is an organohydrogensiloxane containing an average of at least two silicon-bonded hydrogen atoms per molecule. It is used to crosslink the composition of the present invention. The silicone-bonded hydrogen atoms in component (B) react with the alkenyl groups in component (A) in order to cure the composition of the present invention. In order for the composition of the present invention to cure to a silicone elastomer, the sum of the average number of silicon-bonded alkenyl groups per molecule in component (A) and the average number of silicon-bonded hydrogen atoms per molecule in component (B) must be greater than 4. Depending upon the amount of and hydrogen content of component (B) used, the silicone bonded hydrogen atoms in the organosiloxane may also be used to generate gas for foaming the composition of the present invention.

Organohydrogensiloxanes that may be used as component (B) preferably contain an average of more than two silicon-bonded hydrogen atoms per molecule, and more preferably contain an average of at least three silicon-bonded hydrogen atoms per molecule. The remaining valances on the silicon atoms are satisfied with organic groups selected from alkyl groups having less than 7 carbon atoms, halogenated alkyl groups having less than 7 carbon atoms and aryl groups. The preferred aryl group is phenyl. Preferred alkyl groups are methyl, ethyl, and hexyl. Most preferred alkyl groups are methyl groups. The preferred halogenated alkyl group is 3,3,3,-trifluoropropyl.

The organohydrogensiloxane of component (B) can have a linear or branched structure, and can be a homopolymer, a copolymer, or a mixtures of these types of polymers.

Polymers that are suitable for use as component (B) include, but are not limited to, polymethylhydrogensiloxane, trimethylsiloxy-terminated polymethylhydrogensiloxane, copolymers of dimethylsiloxane, methylhydrogensiloxane and trimethylsiloxane units and copolymers of dimethylsiloxane, methylhydrogensiloxane and dimethylhydrogensiloxane units.

A preferred linear type of organohydrogensiloxane has a viscosity of from 0.01 to 10 Pa.s at 25° C. and comprises dialkylsiloxane and alkylhydrogensiloxane units with trialkylsiloxy terminal units. The alkyl groups contain from 1 to 4 carbon atoms and are most preferably methyl. In preferred embodiments, component (B) comprises two types of organohydrogensiloxanes, one of which is a polymethylhydrogensiloxane and the other of which is a copolymer containing methylhydrogensiloxane and dimethylsiloxane units.

The portion of component (B) used should be sufficient to provide the desired degree of crosslinking during cure and to produce the required amount of hydrogen gas for foaming the mixture. Generally, the proportion of component (B) in the composition of the present invention is an amount ranging from 1 to 40 parts by weight per 100 parts of component (A). In preferred embodiments, component (B) is present in an amount ranging from 5 to 30 parts per 100 parts of component (A). In more preferred embodiments, component (B) is present in an amount ranging from 7 to 20 parts per 100 parts of component (A).

The molar ratio of silicon-bonded hydrogen atoms to vinyl or other ethylenically unsaturated hydrocarbon groups in compositions curable by a hydrosilation reaction is important with respect to the properties of the cured elastomer. The optimum ratio for the present curable compositions will be determined at least in part by the molecular weight of the polyorganosiloxane and the type of crosslinking agent. The relative concentration of organohydrogensiloxane (component B)) and polyorganosiloxane (component (A)) in the composition of the present invention is equivalent to a molar ratio of silicon-bonded hydrogen atoms to alkenyl radicals that is typically form 3.5:1 to 7.5:1.

The Blowing Agent—Component C

Component C is a blowing agent. Compositions of the present invention may contain one or more blowing agents. Compounds which are usable as blowing agents for the present compositions are compounds which generate a gas when used in the composition of the present invention or compounds which volatilize to a gaseous state when used in the composition of the present invention. Such compounds include, but are not limited to water, alcohols, silanols and other —OH containing compounds. The alcohols which may be used as the blowing agent for the present invention include organic alcohols and the organic alcohols which may be used in the present invention include monofunctional alcohols and polyols. The preferred monofunctional alcohol is an organic alcohol having 1 to 12 carbon atoms and at least one hydroxyl group per molecule. The carbon chain which makes up the backbone of the organic alcohol may be straight chained or branched or may have an aromatic ring to which a hydroxyl group is not directly bonded. Examples of monofunctional alcohols which are usable as blowing agents for the present invention include methanol, ethanol, n-propanol, isopropanol, n-butanol, 2-butanol, tert-butanol, n-octanol, and benzyl alcohol. The preferred monofunctional alcohol is benzyl alcohol. The preferred polyol is an organic alcohol having 3 to 12 carbon atoms and containing an average of at least two hydroxyl groups per molecule. The carbon chain which makes up the backbone of the polyol may be straight chained or branched or may have an aromatic ting to which a hydroxyl group is not directly bonded. The preferred polyol is a diol. Preferred diols are 1,4 butanediol, 1,5 pentanediol, and 1,7-heptanediol. Preferred blowing agents for the composition of the present invention are organic alcohols. More preferred blow agents are monofunctional alcohols.

Sufficient blowing agent should be used to obtain the necessary amount of hydrogen gas for the foaming process. Generally, 0.1 to 20 parts by weight of component C should be used per 100 parts by weight of the combined weights of components (A) and (B). The preferred amount of component (C) is 0.1 to 15. parts by weight per 100 parts of the combined weight of components (A) and (B). The more preferred amount of component C is 5 to 13 parts by weight per 100 parts by weight of components (A) and (B).

The Platinum-Group Catalyst—Component (D)

Component (D) is a metal from the platinum group of the periodic table or a compound of such a metal. These metals include platinum, palladium and rhodium. Platinum and platinum compounds are preferred based on the high activity level of these catalysts in hydrosilylation reactions. Catalysts that may be used as component (D) in the organosiloxane composition of the present invention are any of the known forms that are effective in promoting the reaction of —SiH groups with silicon-bonded alkenyl groups. Such catalysts are also efficient in promoting the reaction between SiH and ≡COH groups in organic alcohols to provide hydrogen for the foaming process.

Suitable forms of platinum include but are not limited to chloroplatinic acid, platinum compounds and complexes of platinum compounds with unsaturated organic compounds or with siloxanes having silicon-bonded groups containing ethylenically unsaturated groups. Additional examples of suitable platinum catalysts include complexes of platinous halides or chloroplatinic acid with divinyltetramethyldisiloxane and tetramethyldisiloxane. Suitable platinum catalysts are described in U.S. Pat. No. 3,419,593, which issued on Dec. 31, 1968, and which is incorporated herein by reference for what it teaches about the preparation of such catalysts.

The concentration of component (D) in the present composition is equivalent to a platinum concentration of from 0.1 to 500 parts by weight of platinum metal, preferably from 5 to 50 parts by weight of platinum metal, and more preferably 25 to 100 parts by weight of platinum metal, per million parts (ppm), based on the combined weights of components (A) and (B).

The Adhesion Promoter—Component (E)

Component (E) is an adhesion promoter. The adhesion promoter of the present invention comprises (i) an epoxy-functional compound; (ii) a hydroxyl-functional compound comprising at least one hydroxy group and in the same molecule at least one alkenyl group; (iii) a tetraalkylorthosilicate; (iv) an organotitanate; and (v) an aluminum compound or a zirconium compound.

The Epoxy-Functional Compound—Component (i)

Component (i) is an epoxy-functional compound. Examples of epoxy-functional compounds which may be useful in the present composition are described in, for example, Matsumoto et al., JP (Kokai) 60-101146; Tanaka et al., EP 0-497-349 A2; and Schulz, U.S. Pat. No. 4,087,585, all of which are incorporated herein by reference. The epoxy functional compound can be a non-silicon containing compound such as

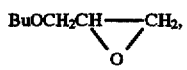  (1)

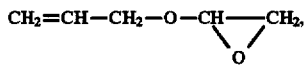  (2)

$CH_2=CH-(C_6H_9O)$,  (3)

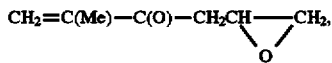  (4)

where Bu is butyl and Me is methyl.

The epoxy-functional compound can be a random or block siloxane copolymer described by, for example, formula

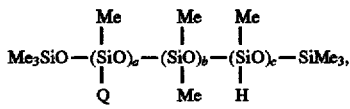  (5)

a siloxane described by, for example, formula

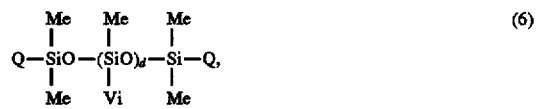  (6)

or by a cyclic siloxane described by formula

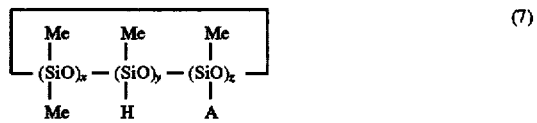  (7)

where Q is described by formula

wherein a, b, and c are positive integers, d=0 or a positive integer, z is a positive integer, x and y are zero or a positive integer, the sum of $3 \geq (x+y+z) \leq$ about 8, and the value of e is in the range of 3 to about 10. The preferred value of e is 3.

A preferred epoxy-functional compound is an epoxy-functional alkoxysilane described by general formula

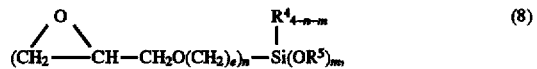  (8)

where $R^4$ is a saturated substituted or unsubstituted hydrocarbon comprising one to about 10 carbon atoms, $R^5$ is an unsubstituted alkyl comprising one to about 10 carbon atoms, n=1, 2, or 3, m=1, 2, or 3, n+m=2, 3, or 4, and e=3 to about 10. In the epoxy functional alkoxysilane, $R^4$ can be for example, methyl, ethyl, phenyl, and 3,3,3-trifluoropropyl. Preferred is when $R^4$ is methyl. In the epoxy-functional alkoxysilane, $R^5$ can be for example methyl, ethyl, propyl, and tert-butyl. Preferred is when $R^5$ is methyl. In the epoxy-functional alkoxysilane it is preferred that m equal at least two, most preferred is when m equals three. A preferred epoxy-functional alkoxysilane for use in the present composition is glycidoxypropyltrimethoxysilane.

The epoxy-functional compound is added to the present curable organosiloxane composition at a concentration of about 0.01 to about 10 parts by weight, and preferably about 0.4 to about 5 parts by weight per 100 parts the Component (A).

A Hydroxyl-functional Compound—Component (ii)

Component (ii) is a compound comprising at least one hydroxy group and in the same molecule at least one alkenyl group. Component (ii) is preferably free of alkoxy groups. Component (ii) can be, for example, a carbinol functional organic compound as described by formula

  (9)

where $R^6$ is a divalent hydrocarbon radical comprising one to about 15 carbon atoms;
a silane described by formula

  (10)

where each $R^7$ is independently selected from a group consisting of saturated hydrocarbon radicals comprising about one to 20 carbon atoms, $R^8$ is an alkenyl group, f=0 to 2, g=1 to 3, and f+g=2 or 3;
a carbinol functional silane described by formula

where $R^6$, $R^7$, and $R^8$ are as previously described, h=0 to 2, i=1 to 3, and h+i=1 to 3;
a hydroxy end-terminated siloxane described by formula

where $R^8$ is as previously described, each $R^9$ is independently selected from a group consisting of saturated unsubstituted and substituted hydrocarbons comprising less than about 12 carbon atoms, p=1 to about 40, t=0 to about 18, and p+t=2 to about 40; and
a siloxane described by formula

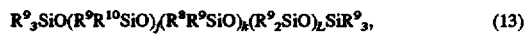

where $R^8$ and $R^9$ are as previously described, $R^{10}$ is a carbinol functional aliphatic or aromatic radical, $j \geq 1$, $k \geq 1$, $L \geq 0$, and j+k+L=2 to 150.

In the carbinol functional compounds described by formula (9), $R^6$ can be, for example, an alkylene such as methylene, ethylene, and propylene or an arylene such as phenylene.

In the silanes described by formula (10), $R^7$ can be for example methyl, ethyl, tert-butyl, cyclopentane, cyclohexane, and phenyl; $R^8$ is an alkenyl such as vinyl, allyl, or hexenyl. Examples of useful silane compounds described by formula (10) can be found in Plueddemann, U.S. Pat. No. 4,659,851, which is incorporated herein by reference.

In formulas (12) and (13), $R^9$ can be, for example, an alkyl such as methyl, ethyl, and propyl; a substituted alkyl such as 3,3,3-trifluoropropyl; an aryl such as phenyl; and a cycloalkyl such as cyclopentyl and cyclohexyl. Preferred is when $R^9$ is methyl. In formulas (12) and (13), each $R^8$ is as previously described. Preferred is when $R^8$ is vinyl.

A preferred component (ii) is a hydroxy end-terminated siloxane as described by formula (12). More preferred is a hydroxy end-terminated siloxane described by formula (12) where $R^8$ is vinyl, $R^9$ is methyl, p=1, and t=4.

The amount of component (ii) added to the present composition is about 0.01 to 5 parts per 100 parts of component (A). Preferred is when about 0.1 to 2 parts of component (ii) is added per 100 parts of component (A).

A tetraalkylorthosilicate—Component (iii)

Component (iii) is a tetraalkylorthosilicate. The tetraalkylorthosilicates of the present invention preferably contain from 1 to 6 carbon atoms and more preferably 2 to 3 carbon atoms. Most preferred is tetraethylorthosilicate. Component (iii) is present in an amount ranging from 0.1 to 5 parts by weight per 100 parts of component (A). In preferred embodiments, the present composition contains 0.6 to 3.0 parts of component (iii) per 100 parts of component (A).

Titanate—Component (iv)

Component (iv) is an organotitanate. Preferred organotitanates are tetraalkyltitanates. The preferred tetraalkyltitanate is tetrabutyltitanate. Component (iv) is present in an amount ranging from 0.01 to 1 parts by weight per 100 parts of component (A). In preferred embodiments, the present composition contains 0.1 to 1.0 parts by weight of component (iv). When silicone foams made from compositions containing less than 0.01 parts of component (iv) are cured at low temperatures, they do not exhibit adhesion to plastic and other substrates.

Aluminum or Zirconium Compound—Component (v)

The aluminum compound or zirconium compound constituting component (v) serves to further improve the adhesion of the present curable organopolysiloxane compositions by its combined use with components (i) through (iv). Useful aluminum compounds and zirconium compounds are taught in Morita et al., U.S. Pat. No. 4,742,103, and in Matsumoto et al., J.P. (Kokai) 60-101146, which are incorporated by reference. The aluminum compound or zirconium compound can be an alcoholate comprising alkoxides, phenoxides, and carboxylates and those compounds where one or more of the alkoxide, phenoxide, or carboxyl groups are replaced by organic ligands or organosilicon groups derived from component (i). The alkoxy groups are exemplified by methoxy, ethoxy and iso-propoxy; the phenoxy groups are exemplified by phenoxy and p-methylphenoxy; and the carbonoxyl groups are exemplified by acetoxy, propionyloxy, isopropionyloxy, butyroxy, and stearoyloxy. The aluminum compound or zirconium compound can be a chelate such as obtained by the reaction of an aluminum alcoholate or zirconium alcoholate with an acetoacetate or dialkylmalonate. The aluminum compound or zirconium compound can be an organic salt of the aluminum or zirconium oxide or can be aluminum or zirconium acetylacetonate.

Aluminum compounds are preferred in the present composition. Aluminum compounds useful in the present compositions can include, for example, aluminum acetylacetonate, aluminum triisopropoxide, aluminum tri-t-butoxide, aluminum triacetate, aluminum tristearate, aluminum tribenzoate, bisethylacetoacetatealuminum monoacetylacetonate, acetoalkoxyaluminum diisopropylate, and aluminum 2,4-pentanedionate. The preferred aluminum compound is aluminum acetylacetonate.

The zirconium compounds useful as component (v) are analogs of the described aluminum compounds. Specific examples are $Zr(OH)_2(C_2H_3)_2$ and $Zr\{CH(COCH_3)_2\}_4$.

Component (v) is added to the present composition within the range of about 0.0005 to 1 part by weight, preferably from 0.001 to 0.2 part by weight per 100 parts by weight of component (A). The presence of too little component (v) will not provide an increase in adhesion, while the addition of an excess quantity is uneconomical and may adversely effect physical properties of the cured composition such as compression set and flammability.

The present invention also provides a method of improving the adhesion of a silicone foam to a substrate comprising the steps of:

(I) preparing a foam-forming composition comprising:
  (A) a polyorganosiloxane containing an average of at least two alkenyl radicals per molecule;
  (B) an organohydrogensiloxane having an average of at least two silicon-bonded hydrogen atoms per molecule;
  (C) a blowing agent;
  (D) a platinum catalyst; and
  (E) an adhesion promoter comprising:
    i) an epoxy-functional compound;
    ii) a hydroxyl-functional compound comprising at least one hydroxy group and in the same molecule at least one alkenyl group;
    iii) a tetraalkylorthosilicate;

iv) an organotitanate; and v) an aluminum or zircon into compound;

wherein the sum of the average number of alkenyl groups per molecule in component (A) and the average number of silicon-bonded hydrogen groups in component (B) is greater than 4;

(II) applying the composition to a substrate;

(III) allowing the composition to form a foam; and (IV) allowing the composition to cure.

The method of this invention is carded out by preparing a foamable, curable organosiloxane composition by mixing together components (A) though (E) and any optional ingredients. As long as the components are mixed to homogeneity, the method of mixing is not critical. Mixing can be done, for example, manually, or with the use of static, dynamic or impingement-type mixing equipment. After components (A) through (E) and any optional ingredients have been mixed to homogeneity, the foam-forming composition can be applied to a substrate. The method of application is not critical and can include, for example, pouring, spraying, or dispensing. The application method may be manual or by way of automatic dispensing equipment. The foamable composition is foamed and cured on the substrate. The substrate is preferably plastic. The preferred plastic is acrylonitrile-butadiene-styrene copolymer.

The foam-forming composition will begin to foam, at normal ambient temperatures, shortly after mixing have been commenced. If desired, the onset of foaming and curing can be delayed by including an inhibitor in the foam-forming composition. Although cure of the foam will occur at normal ambient temperatures, the adhesion of the foam to the substrate will be improved if the foam is cured at an elevated temperature. In preferred embodiments, the foam-forming composition is cured for a minimum of 5 minutes at a temperature of at least 75° C. The cured foam may also be post-cured to improve the physical properties of the cured foam.

Optional Ingredients

In addition to the components identified as (A), (B), (C), (D) and (E), the present compositions can contain various components to modify the properties of the curable composition and/or the cured foam.

These optional ingredients include but are not limited to finely divided reinforcing and non-reinforcing mineral fillers such as quartz and calcium carbonate; metal oxides such as alumina, hydrated alumina, ferric oxide and titanium dioxide; pigments such as carbon black and zinc oxide; organic pigments and dyes, anti-oxidants, heat stabilizers, ultraviolet stabilizers, flame retarding agents and catalyst inhibitors such as cyclic methylvinylsiloxanes to increase the working time of the curable composition.

A preferred optional ingredient in the present compositions is a resinous organosiloxane copolymer containing triorganosiloxy and $SiO_{4/2}$ units. The triorganosiloxy units in this type of copolymer can be represented by the formula $R^{11}_3SiO_{1/2}$, where $R^{11}$ represents a monovalent unsubstituted or substituted hydrocarbon radical. In preferred copolymers the hydrocarbon radicals represented by $R^{11}$ are a combination of lower alkyl, most preferably methyl. The molar ratio of triorganosiloxy units to $SiO_{4/2}$ units in the copolymer is typically from 0.7 to 1.2, inclusive. The copolymer constitutes up to 30 percent of the combined weight of the curable alkenyl-substituted polyorganosiloxane and the copolymer, and at least a portion of the silicon atoms in the copolymer contain ethylenically unsaturated hydrocarbon radicals such as vinyl as substituents.

Preparation of Curable Compositions

The compositions of this invention are prepared by blending the components of these compositions to homogeneity. The present compositions begin to cure and foam when components A, B, C and D are combined. If it is desired to store the compositions prior to curing them this can be achieved by packaging the components in two or more containers with the organohydrogensiloxane (component B)) and catalyst (component (D)) in separate containers. In a two part system, it is preferred that component (i) and component (v) be packaged in different parts.

Both the curing and foaming reactions are accelerated by heating the curable composition. Reaction temperatures from about 30° to 75° C. are preferred. The time required for foaming and curing of the present compositions is typically from 3 to 30 minutes, based on the reactivity of the components and the temperature.

EXAMPLES

The following examples describe preferred embodiments of the present compositions and should not be interpreted as limiting the scope of the invention defined in the accompanying claims. All parts and percentages in the examples are by weight and viscosities were measured at 25° C.

The compositions of the Examples and Comparative Examples were prepared as follows. Part A of Comparative Example 1 was prepared by mixing to a portion of the dimethylvinylsiloxy-terminated dimethylsiloxane, the alumina hydrate and the castor oil until the temperature of the mixture reached 150° F. The remaining dimethylvinylsiloxy-terminated dimethylsiloxane was admixed and the mixture was cooled. The remaining ingredients were then admixed and the resulting composition was mixed under vacuum. Part B of Comparative Example 1 was prepared by admixing the first three of the ingredients of Part B until the temperature of the mixture rose to 150° F., when the temperature of the mixture had fallen to below 100° C., the remaining ingredients were admixed.

Experiment 1

The adhesive properties of Comparative Example 1 and Examples 1–9 where evaluated according to the following method. Part A of each of the Examples was prepared by mixing the listed ingredients of Part A to homogeneity. Part B of each of the Examples was prepared by mixing the ingredient of Part B to homogeneity. 50 parts of Part A and 50 parts of Part B were mixed for 1 minute. A thin layer (approximately 3 grams) of the mixture was spread on a sheet of black acrylonitrile-butadiene-styrene copolymer plastic. The sheet of plastic measured 1.25 inch by 6 inches by 0.125 inches (3.18 cm by 15.24 cm by 0.32 cm) A screen measuring 1 inch by 16 inches, (2.54 cm by 40.64 cm) and having a mesh size of 15, was placed over and pressed into the layer. Another 3 grams of the mixture was spread on top of the screen. The mixture began to foam. The plastic, screen and foam was placed in an oven at 75° C. for 10 minutes. The plastic, screen and foam were removed from the oven and allowed to cool for 12 hours at ambient temperatures. The plastic and foam were trimmed to a width of 1 inch (2.54 cm). The edge of the screen was lifted away from the plastic and foam at an angle of 90 degrees. An incision was made in the foam at the juncture of the foam and the plastic along the 1 inch (2.54 cm) width of the foam and plastic. The edge of the screen was clamped into a tensometer in order to determine the peel strength. The tensometer was set with a travel distance of 1 inch (25 mm), a pull rate of 0.5 inches (12.7 mm) per minute, and a pull force of 100 Newtons. The peel strength was recorded in Table 1.

Experiment 2

The adhesive properties of Comparative Examples 1, 2 and 3 and Example 10 where evaluated according to the following method. A Teflon® mold having a 0.5 inches (1.27 cm) wide bead grove was clamped to a sheet of gray acrylonitrile-butadiene-styrene copolymer plastic. "TEFLON" is a registered trademark of E. I. DuPont de Nemours and Company, Inc. of Wilmington, Del. 50 parts of Part A and 50 parts of Part B were mixed together in a cup for 1 minute. The mixture was poured into the grove until the mixture was level with the top of the mold. The mixture was allowed to foam. The plastic sheet, the Teflon® mold and the foam were placed in an oven for 10 minutes at 75° C. in order to cure the foam. The cured foam was allowed to cool for 10 minutes at ambient temperatures. The Teflon® mold was then removed leaving the foam and the plastic sheet. The adhesion of the foam to the plastic sheet was manually tested to determine the level of adhesive failure. Foams which exhibited 0% cohesive failure were rated "1", indicating a slight adhesion. Foams which exhibited up to 10% cohesive failure were rated "2", indicating a slight to moderate adhesion. Foams which exhibited over 10 to 50% cohesive failure were rated "3", indicating a moderate adhesion. Foams which exhibited over 50% but less than 100% cohesive failure were rated "4", indicating a moderate to strong adhesion. Foams which exhibited 100% cohesive failure were rated "5", indicating a strong adhesion. The adhesive properties of the foams were reported on Table 2.

Comparative Example 1

Part A 75.8 parts by weight of a mixture consisting essentially of 72 weight percent of a dimethylvinylsiloxy-terminated polydimethylsiloxane having a viscosity of about 55 Pa.s at 25° C. and 28 weight percent of a resinous benzene-soluble copolymer containing triorganosiloxy units and $SiO_2$ units in the mol ratio of about 0.7 mol of triorganosiloxy unit per mol of $SiO_2$ units, where the triorganosiloxy units are trimethylsiloxy and dimethylvinylsiloxy, and the copolymer contains about 1.8 weight percent of silicon-bonded vinyl radicals.

1 part by weight of hydrogenated castor oil.

0.5 parts by weight carbon black.

14.8 parts by weight of alumina hydrate.

7.2 parts by weight of benzyl alcohol.

0.53 parts by weight of chlorophtinic acid complex of divinyltetramethyldisiloxane diluted with dimethylvinylsiloxy endblocked polydimethylsiloxane to provide 0.65 weight percent platinum.

Part B 55.5 parts by weight of parts by weight of a mixture consisting essentially of 72 weight percent of a dimethylvinylsiloxy-terminated polydimethylsiloxane having a viscosity of about 55 Pa.s at 25° C. and 28 weight percent of a resinous benzene-soluble copolymer containing triorganosiloxy units and $SiO_2$ units in the mol ratio of about 0.7 mol of triorganosiloxy unit per mol of $SiO_2$ units, where the triorganosiloxy units are trimethylsiloxy and dimethylvinylsiloxy, and the copolymer contains about 1.8 weight percent of silicon-bonded vinyl radicals.

2 parts by weight of hydrogenated castor oil.

25.8 parts by weight of quartz having a typical particle size of less than 5 microns.

12.3 parts by weight of the product obtained by blending 58.8 wt % of a 70 wt % xylene solution of a siloxane resin copolymer consisting essentially of $(CH_3)_3SiO_{1/2}$ units and $SiO_2$ units in a molar ratio of approximately 0.75:1 and containing approximately 2.65 weight percent hydroxyl based on solids as determined by FTIR (ASTM E-168) and 41.2 wt % of trimethylsiloxy endblocked polymethylhydrogensiloxane having a viscosity of 0.13 Pa.s and a silicon-bonded hydrogen atom content of 1.6 wt % and thereafter heating to remove substantially all the solvent. The product has a viscosity of approximately 1400 $mm^2/s$, an SiH content of approximately 0.8 wt % and a hydroxyl content of approximately 1.7 wt %.

4.6 parts by weight of a trimethylsiloxy-terminated polydiorganosiloxane having an average of five methylhydrogensiloxane units and three dimethylsiloxane units per molecule with a silicon-bonded hydrogen atom content of about 0.8 weight percent.

Comparative Example 2

Part A 50 parts by weight of Part A of Comparative Example 1

1.5 parts by weight chloroplatinic acid complex of divinyltetramethyldisiloxane diluted with dimethylvinylsiloxy endblocked polydimethylsiloxane to provide 0.65 weight percent platinum 0.8 parts by weight a hydroxyl-terminated dimethylsiloxane/methylvinylsiloxane copolymer containing 10.5 weight percent of vinyl radicals and 8 weight percent of hydroxyl groups.

1.2 parts by weight gamma-glycidoxypropyltrimethoxysilane 0.05 parts by weight of aluminum acetylacetonate Part B 50 Parts by weight of Part B of Comparative Example 1

Comparative Example 3

Part A 50 pars by weight of Part A of Comparative Example 1

1 part by weight of chlorophtinic acid complex of divinyltetramethyldisiloxane diluted with dimethylvinylsiloxy endblocked polydimethylsiloxane to provide 0.65 weight percent platinum.

1.26 parts by weight of gamma-glycidoxypropyltrimethoxysilane 0.51 parts by weight of a hydroxyl-terminated dimethylsiloxane/methylvinylsiloxane copolymer containing 10.5 weight percent of vinyl radicals and 8 weight percent of hydroxyl groups.

0.11 parts by weight of tetrabutyltitanate 0.05 parts by weight of aluminum acetylacetonate

EXAMPLE 1

Part A 50 parts by weight of Part A of Comparative Example 1

0.13 parts by weight of a hydroxyl-terminated dimethylsiloxane/methylvinylsiloxane copolymer containing 10.5 weight percent of vinyl radicals and 8 weight percent of hydroxyl groups.

0.5 parts by weight of tetrabutyltitanate 0.1 parts by weight of aluminum acetylacetonate Part B 50 parts by weight of Part B of Comparative Example 1

1.25 parts by weight of gamma-glycidoxypropyltrimethoxysilane 0.5 parts by weight of tetraethylorthosilicate

EXAMPLE 2

Part A 50 parts by weight of Part A of Comparative Example 1

0.5 parts by weight of a hydroxyl-terminated dimethylsiloxane/methylvinylsiloxane copolymer containing 10.5 weight percent of vinyl radicals and 8 weight percent of hydroxyl groups.

0.1 parts by weight of tetrabutyltitanate 0.05 parts by weight of aluminum acetylacetonate Part B 50 parts by weight of Part B of Comparative Example 1

1.25 parts by weight of gamma-glycidoxypropyltrimethoxysilane 0.5 parts by weight of tetraethylorthosilicate

EXAMPLE 3

Part A 50 parts by weight of Part A of Comparative Example 1

0.5 parts by weight of a hydroxyl-terminated dimethylsiloxane/methylvinylsiloxane copolymer containing 10.5 weight percent of vinyl radicals and 8 weight percent of hydroxyl groups.

0.5 parts by weight of tetrabutyltitanate 0.1 parts by weight of aluminum acetylacetonate Part B 50 parts by weight of Part B of Comparative Example 1

1.5 parts by weight of gamma-glycidoxypropyltrimethoxysilane 1.5 parts by weight of tetraethylorthosilicate

EXAMPLE 4

Part A 5 parts by weight of Part A of Comparative Example 1

0.25 parts by weight of a hydroxyl-terminated dimethylsiloxane/methylvinylsiloxane copolymer containing 10.5 weight percent of vinyl radicals and 8 weight percent of hydroxyl groups.

0.5 parts by weight of tetrabutyltitanate 0.1 parts by weight of aluminum acetylacetonate Part B 50 parts by weight of Part B of Comparative Example 1

1.5 parts by weight of gamma-glycidoxypropyltrimethoxysilane 1.5 parts by weight of tetraethylorthosilicate

EXAMPLE 5

Part A 50 parts by weight of Part A of Comparative Example 1

0.13 parts by weight of a hydroxyl-terminated dimethylsiloxane/methylvinylsiloxane copolymer containing 10.5 weight percent of vinyl radicals and 8 weight percent of hydroxyl groups.

0.5 parts by weight of tetrabutyltitanate 0.1 parts by weight of aluminum acetylacetonate Part B 50 parts by weight of Part B of Comparative Example 1

1.5 parts by weight of gamma-glycidoxypropyltrimethoxysilane 1.5 parts by weight of tetraethylorthosilicate

EXAMPLE 6

Part A 50 parts by weight of Part A of Comparative Example 1

0.13 parts by weight of a hydroxyl-terminated dimethylsiloxane/methylvinylsiloxane copolymer containing 10.5 weight percent of vinyl radicals and 8 weight percent of hydroxyl groups.

0.1 parts by weight of tetrabutyltitanate 0.05 parts by weight of aluminum acetylacetonate Part B 50 parts by weight of Part B of Comparative Example 1

0.6 parts by weight of gamma-glycidoxypropyltrimethoxysilane 0.5 parts by weight of tetraethylorthosilicate

EXAMPLE 7

Part A 50 parts by weight of Part A of Comparative Example 1

0.15 parts by weight of a hydroxyl-terminated dimethylsiloxane/methylvinylsiloxane copolymer containing 10.5 weight percent of vinyl radicals and 8 weight percent of hydroxyl groups.

0.1 parts by weight of tetrabutyltitanate 0.1 parts by weight of aluminum acetylacetonate Part B 50 parts by weight of Part B of Comparative Example 1

25 parts by weight of gamma-glycidoxypropyltrimethoxysilane 1 part by weight of tetraethylorthosilicate

EXAMPLE 8

Part A 50 parts by weight of Part A of Comparative Example 1

0.32 parts by weight of a hydroxyl-terminated dimethylsiloxane/methylvinylsiloxane copolymer containing 10.5 weight percent of vinyl radicals and 8 weight percent of hydroxyl groups.

0.3 parts by weight of tetrabutyltitanate 0.1 parts by weight of aluminum acetylacetonate Part B 50 parts by weight of Part B of Comparative Example 1

1.05 parts by weight of gamma-glycidoxypropyltrimethoxysilane 1 part by weight of tetraethylorthosilicate

EXAMPLE 9

Part A 50 parts by weight of Part A of Comparative Example 1

0.13 parts by weight of a hydroxyl-terminated dimethylsiloxane/methylvinylsiloxane copolymer containing 10.5 weight percent of vinyl radicals and 8 weight percent of hydroxyl groups.

0.25 parts by weight of tetrabutyltitanate 0.1 parts by weight of aluminum acetylacetonate Part B 50 parts by weight of Part B of Comparative Example 1

1.25 parts by weight of gamma-glycidoxypropyltrimethoxysilane 1 part by weight of tetraethylorthosilicate.

EXAMPLE 10

Part A 50 parts by weight of Part A of Comparative Example 1

0.5 parts by weight of a hydroxyl-terminated dimethylsiloxane/methylvinylsiloxane copolymer containing 10.5 weight percent of vinyl radicals and 8 weight percent of hydroxyl groups.

0.5 parts by weight of tetrabutyltitanate 0.1 parts by weight of aluminum acetylacetonate Part B 50 parts by weight of Part B of Comparative Example 1

1.5 parts by weight of gamma-glycidoxypropyltrimethoxysilane 1.5 parts by weight of tetraethylorthosilicate

TABLE 1

Peel Strengths of Silicone Foams

| | 90 Degree Peel Test (pounds/inch) | 90 Degree Peel Test (newtons/meter) |
|---|---|---|
| Comparative Example 1 | 0.9 | 157.61 |
| Example 1 | 1.7 | 297.72 |
| Example 2 | 1.6 | 280.20 |
| Example 3 | 4.0 | 700.51 |
| Example 4 | 1.2 | 210.15 |
| Example 5 | 1.4 | 245.18 |
| Example 6 | 1.3 | 227.66 |
| Example 7 | 2.7 | 472.84 |
| Example 8 | 1.5 | 262.69 |
| Example 9 | 1.4 | 245.18 |

TABLE 2

Adhesion of Silicone Foams to Plastic.

| | Adhesion | |
|---|---|---|
| Comparative Example 1 | 2 | slight to moderate adhesion |
| Comparative Example 2 | 3 | moderate adhesion |
| Comparative Example 3 | 3 | moderate adhesion |
| Example 10 | 5 | strong adhesion |

That which is claimed is:

1. A method of improving the adhesion of a silicone foam to a substrate, said method comprising the steps of:

(I) preparing a foamable, curable organosiloxane composition comprising:
  (A) 100 parts by weight of a polyorganosiloxane containing an average of at least two alkenyl radicals per molecule and having a viscosity within a range of about 0.03 Pa.s to 100 Pa.s at 25° C.;
  (B) an organohydrogensiloxane having an average of at least two silicon-bonded hydrogen atoms per molecule;
  (C) a blowing agent;
  (D) a catalytically effective amount of a platinum group metal catalyst; and
  (E) an adhesion promoter comprising:
    i) 0.01 to 10 parts by weight, per 100 parts by weight of Component (A), of an epoxy-functional compound;
    ii) 0.01 to 5 parts by weight, per 100 parts by weight of Component (A), of a hydroxyl-functional compound comprising at least one hydroxy group and in the same molecule at least one alkenyl group;
    iii) 0.1 to 5 parts by weight, per 100 parts by weight of Component (A), of a tetraalkylorthosilicate;
    iv) 0.01 to 1 parts by weight, per 100 parts of component (A), of a organotitanate; and
    v) 0.0005 to 1 part by weight of a catalyst selected from a group consisting of compounds of aluminum and compounds of zirconium;

wherein the sum of the average number of silicon-bonded hydrogen atoms per molecule of component (B) and the average number of silicon-bonded alkenyl groups per molecule in component (A) is greater than 4;

(II) applying the foamable, curable composition to the substrate;

(III) allowing the foamable, curable composition to form a foam; and (IV) allowing the foamable, curable composition to cure.

2. The method of claim 1, wherein the substrate is a plastic.

3. The method of claim 2, wherein the plastic is a acrylonitrile-butadiene-styrene copolymer.

* * * * *